US006687651B2

(12) United States Patent
Stewart

(10) Patent No.: US 6,687,651 B2
(45) Date of Patent: Feb. 3, 2004

(54) REAL TIME ESTIMATION OF EQUIVALENT BANDWIDTH UTILIZATION

(75) Inventor: Mark A. W. Stewart, Kew (AU)

(73) Assignee: Fujitsu Network Communications, Inc., Richardson, TX (US)

( * ) Notice: Subject to any disclaimer, the term of this patent is extended or adjusted under 35 U.S.C. 154(b) by 108 days.

(21) Appl. No.: 10/044,818

(22) Filed: Jan. 10, 2002

(65) Prior Publication Data

US 2003/0130819 A1 Jul. 10, 2003

(51) Int. Cl.[7] ................................................ G06F 11/30
(52) U.S. Cl. ........................................ 702/182; 370/351
(58) Field of Search ................................ 702/182, 122, 702/183, 186, 188, FOR 134, FOR 135, FOR 104, FOR 170; 370/351, 389, 395.2, 395.21, 395.31, 395.32, 395.4, 230.1; 709/224, 223, 241

(56) References Cited

U.S. PATENT DOCUMENTS

| 5,548,581 | A | | 8/1996 | Makrucki | 370/17 |
|---|---|---|---|---|---|
| 5,754,530 | A | | 5/1998 | Awdeh et al. | 370/232 |
| 5,805,577 | A | | 9/1998 | Jain et al. | 370/234 |
| 5,838,663 | A | | 11/1998 | Elwalid et al. | 370/233 |
| 5,862,126 | A | | 1/1999 | Shah et al. | 370/230 |
| 5,991,268 | A | | 11/1999 | Awdeh et al. | 370/232 |
| 6,112,248 | A | | 8/2000 | Maciel et al. | 709/238 |
| 6,144,639 | A | | 11/2000 | Zhao et al. | 370/235 |
| 6,411,997 | B1 | * | 6/2002 | Dawes et al. | 709/224 |
| 6,591,299 | B2 | * | 7/2003 | Riddle et al. | 709/224 |
| 6,597,660 | B1 | * | 7/2003 | Rueda et al. | 370/230.1 |
| 2002/0178287 | A1 | * | 11/2002 | Sahinoglu et al. | 709/241 |

\* cited by examiner

*Primary Examiner*—John Barlow
*Assistant Examiner*—Xiuqin Sun
(74) *Attorney, Agent, or Firm*—Weingarten, Schurgin, Gagnebin & Lebovici LLP

(57) ABSTRACT

An apparatus and method for generating via integer calculations a metric for estimating link utilization within a network device having at least one output port. The metric is determined by calculating at least three data rate link parameters for a given sampling period. The data rate link parameters include an error data rate parameter, an average data rate parameter, and a deviation data rate parameter. These parameters are determined using integer values and integer operations and may be used by a link management system for performing load balancing among a plurality of output ports and for determining whether to forward low priority data traffic via a particular output port.

27 Claims, 4 Drawing Sheets

REAL TIME ESTIMATION OF EQUIVALENT BANDWIDTH UTILIZATION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates to computer data network devices and in particular to measuring various performance metrics of and controlling data routing within the data network devices based on the measured performance metrics.

As computer networks continue to grow in size and capacity, data stream management systems are needed to ensure that data is not lost due to a link that is carrying an excessive amount of data. In particular, a data stream management system will need data rate information and other link-usage parameters in order to provide optimal, or near optimal, link allocation for data transmission thereon. The use of data stream management systems will allow more efficient use of link resources by allowing data to be transmitted over links that are currently being used at a level that is less than their overall capacity. In addition, a data stream management system can allow the reallocation of available bandwidth to lower priority signals when higher priority signals are not being transmitted, allowing increased revenue for the data carriers. Currently data stream management systems utilize complex statistical models that are implemented in software to derive the link-usage parameters. These statistical models typically require a large amount of historical data to produce acceptable results. As this historical data is gathered the statistical model either does not operate, or operates inaccurately. Accordingly, a loss of data can result during this time. In addition, the current software based systems use floating point operations which can result in slower calculations.

Accordingly it would be advantageous to provide a hardware based data stream management system that has a shorter time constant for producing useful output and is able to capture more data and provide an accurate second quarter estimate of the data link parameters.

BRIEF SUMMARY OF THE INVENTION

An apparatus for estimating link utilization within a network device having at least one output port is disclosed in which an integer counter is associated with the at least one output port and the integer counter is incremented in response to a predetermined event associated with the transmission of data through the output port. The integer counter is sampled periodically to determined the quantity of data transmitted through the at least one output port within a sampling period. For each sampling period an error value equal to the quantity of data minus a historical mean value corresponding to the mean value of data transmitted from the at least one output port during prior sampling periods is calculated. Also for each sampling period a current mean value equal to the historical mean value plus the product of a first predetermined multiplier times the error value is calculated, and a current deviation value equal to a historical deviation plus the product of a second predetermined multiplier multiplied by the difference of the absolute value of the error value minus the historical deviation value is also calculated. The error value, the current mean value, the historical mean value, and the current deviation value are all integer values.

DETAILED DESCRIPTION OF THE INVENTION

Figure 1:
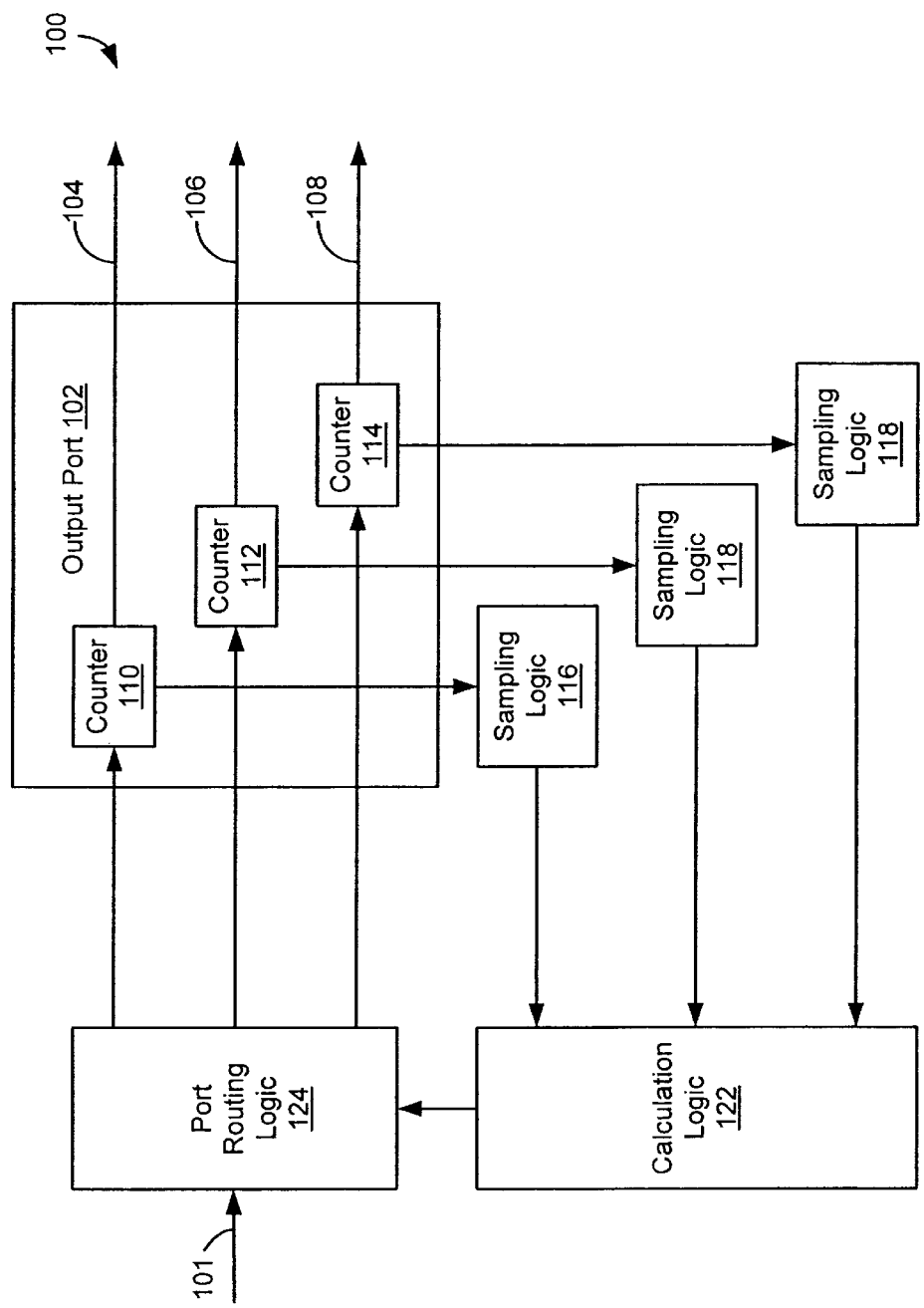
FIG. 1 is a block diagram depicting one embodiment of the present invention.
Figure 2:
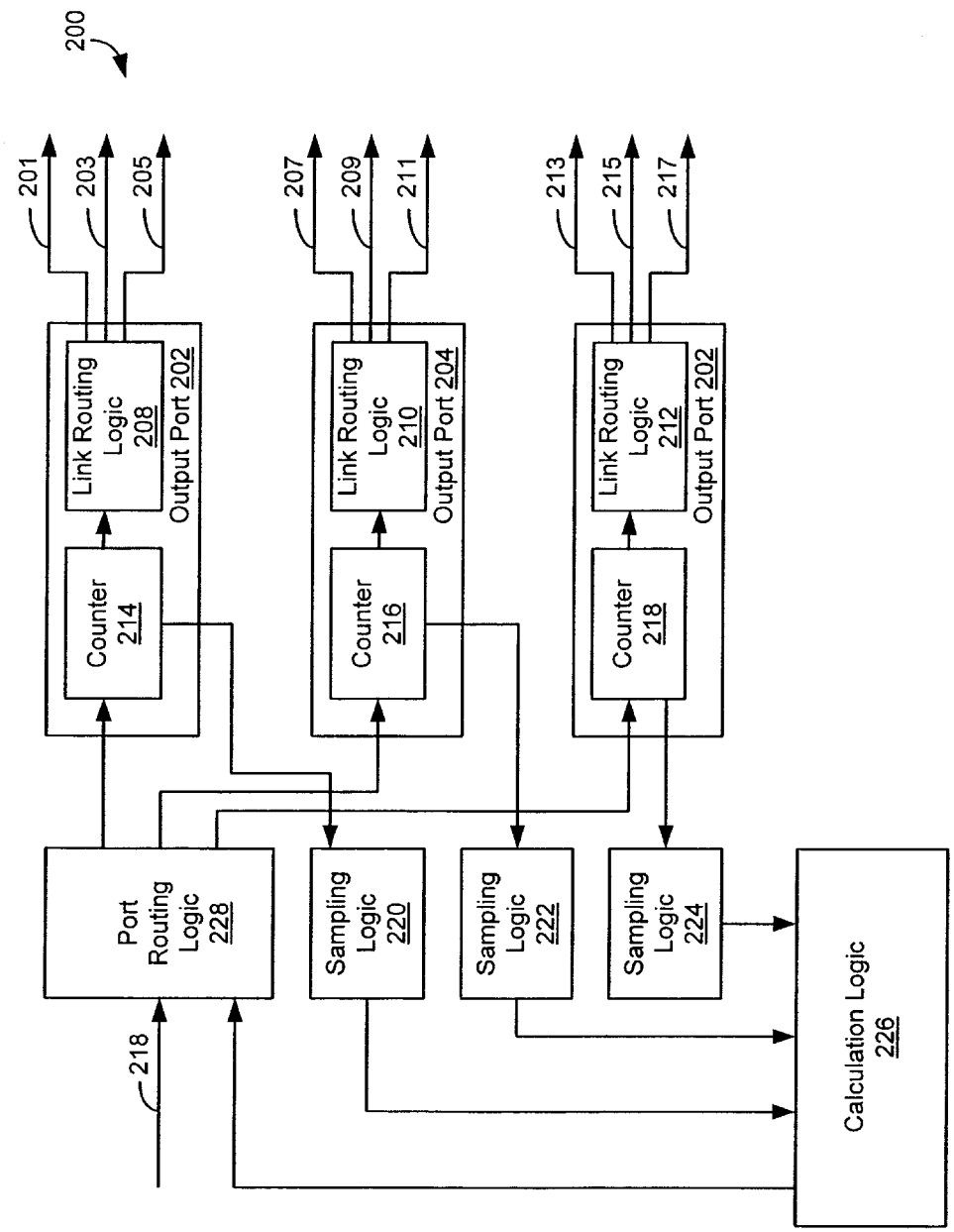
FIG. 2 is a block diagram depicting a second embodiment of the present invention.

FIG. 1 and FIG. 2 depict two block diagrams of an apparatus and corresponding method for managing and routing data streams to one or more output ports having one or more output links. As depicted in FIG. 1, an output port 102 includes a plurality of output links 104, 106, and 108. Each of the output links 104, 106, and 108 includes an integer counter 110, 112, and 114 associated therewith. Each of the integer counters is incremented in response to a predetermined event associated with transmission of data to the respective link. Each of the integer counters 110, 112, and 114 have a corresponding sample logic module 116, 118, and 120 associated therewith. The sampling logic periodically samples the integer counter and latches the integer count contained therein. The integer count is provided to a calculation logic 122. The calculation logic 122 uses the data rate information from each link to determine the link usage parameters associated with the particular link. In particular, the link calculation logic 122 determines a mean data rate value, a data rate error value, and a deviation error value for the corresponding link. As will be explained in more detail below, the calculation logic 122 provides one or more of these determined link usage parameters to a port routing logic 124 that is used to route an incoming data stream 101 to a particular link.

The sampling logic 116, 118, and 120 are used to periodically sample the integer counter 110, 112, and 114 associated therewith at a particular sample rate. In general the data stream is divided into a series of consecutive time slots, wherein the integer counter is sampled at substantially the same point within each timeslot. The selection of a timeslot size is a system specific parametric and is determined by the counter size, the size of a data input memory data buffer, and the data rate. In general, the data input memory buffer is able to absorb some variation in the data throughput rate, such that the timeslot size and sample period should be selected to avoid deviations in data rate that are unable to be absorbed by the buffer.

The calculation logic 122 first determines an error value for timeslot "n" that is equal to the quantity of data transferred in the timeslot minus the historical mean data rate value, i.e., the mean data rate value as determined in the previous timeslot. The current mean data rate value is equal to the mean data rate value of the previous timeslot minus the error value of the current timeslot times a first predetermined multiplier. The current deviation data rate value is equal to the deviation value of the previous timeslot plus the product of a second predetermined multiplier multiplied by the difference of the absolute value of the error value of the current timeslot minus the deviation value of the previous timeslot. These equations are illustrated below.

$$Err_n = A_n - M_{n-1} \quad (1)$$

$$M_n = M_{n-1} - (h * Err_n) \quad (2)$$

$$D_n = D_{n-1} + g * (|Err_n| - D_{n-1}) \quad (3)$$

where n is the current time slot and n−1 is the previous time slot, and h and g are typically negative powers of two. In general h is greater than g. In a preferred embodiment h is equal to $\frac{1}{4}^{th}$ and g is equal to $\frac{1}{8}^{th}$. Accordingly, the preferred embodiment of the system is able to advantageously provide data in a more timely fashion than current systems that use floating point calculations by using integer calculations.

Each link therefore has associated therewith an estimated mean and an estimated deviation of the data rate through the link that may be used by a data stream management system. In particular, a data stream management system can include routing logic that receives a data stream as an input and provides a portion of that data stream to a predetermined port or link, wherein the port or link is selected as a function of the current mean data rate value and the current deviation data rate value of the available port or link. In particular, a bandwidth metric for each port or link may be determined by adding the current mean data rate value to the product of a third predetermined multiplier, "k", and the current deviation data rate value. This is equivalent to expressing the data rate value within a selected confidence interval, such that for a particular value of k, the probability that the mean data rate value will be within that range is predetermined. For example, for k=1 the mean data rate value will be within plus or minus one deviation of the calculated value with a probability of approximately 0.7. For k=2, the probability that the mean data rate value will be within the particular confidence interval that is plus or minus two deviations of the mean data rate value with a probability that is approximately 0.95, and for k=3, the probability that the data rate mean value will be within the confidence interval that is plus or minus three deviations of the mean data rate value with a probability that is 0.99. Thus, the bandwidth metric calculated above can be used as an estimate of the traffic carried on a particular link within specific confidence intervals.

Using the above calculated metric, load balancing may be performed by the data stream management system. In particular, data rate estimators, i.e., the mean data rate value and a deviation data rate value are calculated for each link and the utilized bandwidth metric described above is calculated for each link as well. When a data stream is received by the routing logic, the routing logic is provided with the utilized bandwidth metrics calculated for each of the links connected thereto. The routing logic is configured and arranged such that the incoming data stream is routed to the link having the lowest utilized bandwidth metric as calculated using the methods described above. In this way the incoming data stream is provided to the link having the most available bandwidth out of the selection of links. In one embodiment, a value of k=3 is used to provide a confidence interval as described above of approximately 0.9973. Selecting a higher confidence interval, i.e., selecting a larger value of k, allows for a higher probability that the particular link will be able to handle the bandwidth and data rate of the switched traffic and that there is a lower probability that the particular link will be blocked or otherwise overtaxed and result in the loss of data. In the event that two links have the same value of the bandwidth metric calculated above, a predetermined criteria can be used to select which of the two links receives the data stream.

FIG. 2 depicts another embodiment of the presently described data stream management system 200 in which data rate parameters are determined for one or more output ports each of which includes a plurality of links associated therewith. The data rate parameters calculated for each output port are used to route additional data streams to a particular output port but not necessarily to an individual link within that port.

In particular, as depicted in FIG. 2, the plurality of output ports 202, 204, and 206 each include a link routing module 208, 210, and 212 respectively, and a plurality of links associated with each output port and coupled to the respective link routing module. In particular, port 202 includes links 201, 203, and 205, port 204 includes links 207, 209, and 211, and port 206 includes links 213, 215, and 217. Each port 202, 204, and 206 has associated therewith an integer counter 214, 216, and 218 respectively that receives an incoming data stream 218 from port routing logic 228. Each counter 214, 216, and 218 has associated therewith sampling logic 220, 222, and 224 respectively. The integer counters each respond to a predetermined event associated with a transmission of data by incrementing its internal counter. The sampling logic is configured and arranged to periodically sample the corresponding integer counter and to provide this data count to a calculation logic 226. The calculation logic 226 determines parameters associated with each output port and provides this data to the port routing logic 228.

In particular, the calculation module 226 determines the aggregate port parameters using equations 1, 2, and 3 above. In one embodiment, the calculation logic module 226 also computes the bandwidth metric as described above for each port. The calculation module then subtracts the bandwidth metric for each port from the total available bandwidth of that port and provides this difference for each port to the port routing logic 228. The port routing logic 228 receives an incoming data stream and switches this incoming data stream to the port having the largest difference value calculated above. In this way, the port routing logic 228 switches the incoming data stream to the output port having the largest available bandwidth. By selecting k sufficiently large in the formula above for the bandwidth metric, i.e., 3 or 4, a large confidence interval of the upper and lower values of the data is established. Thus, there will be a high probability that the average data rate for the corresponding port will be within the upper and lower values determined by the end points of the confidence interval. Accordingly, a higher probability can assure that the particular output port will not need extra bandwidth above that which has been already allocated. Therefore based on the upper and lower end points determined above, lower priority data may be transmitted through a port that has been reserved for higher priority data with a high probability that the port will not be overtaxed with the concomitant loss of data and blockage. In this way, telecom and data service providers may utilize these data links for other, lower priority traffic. This allows the telecom and data service providers an opportunity to increase the revenue available from these data links by utilizing more of the available bandwidth with a high degree of confidence that the lower priority data added to the link will not result in the blockage and potential loss of higher priority data.

Figure 3:
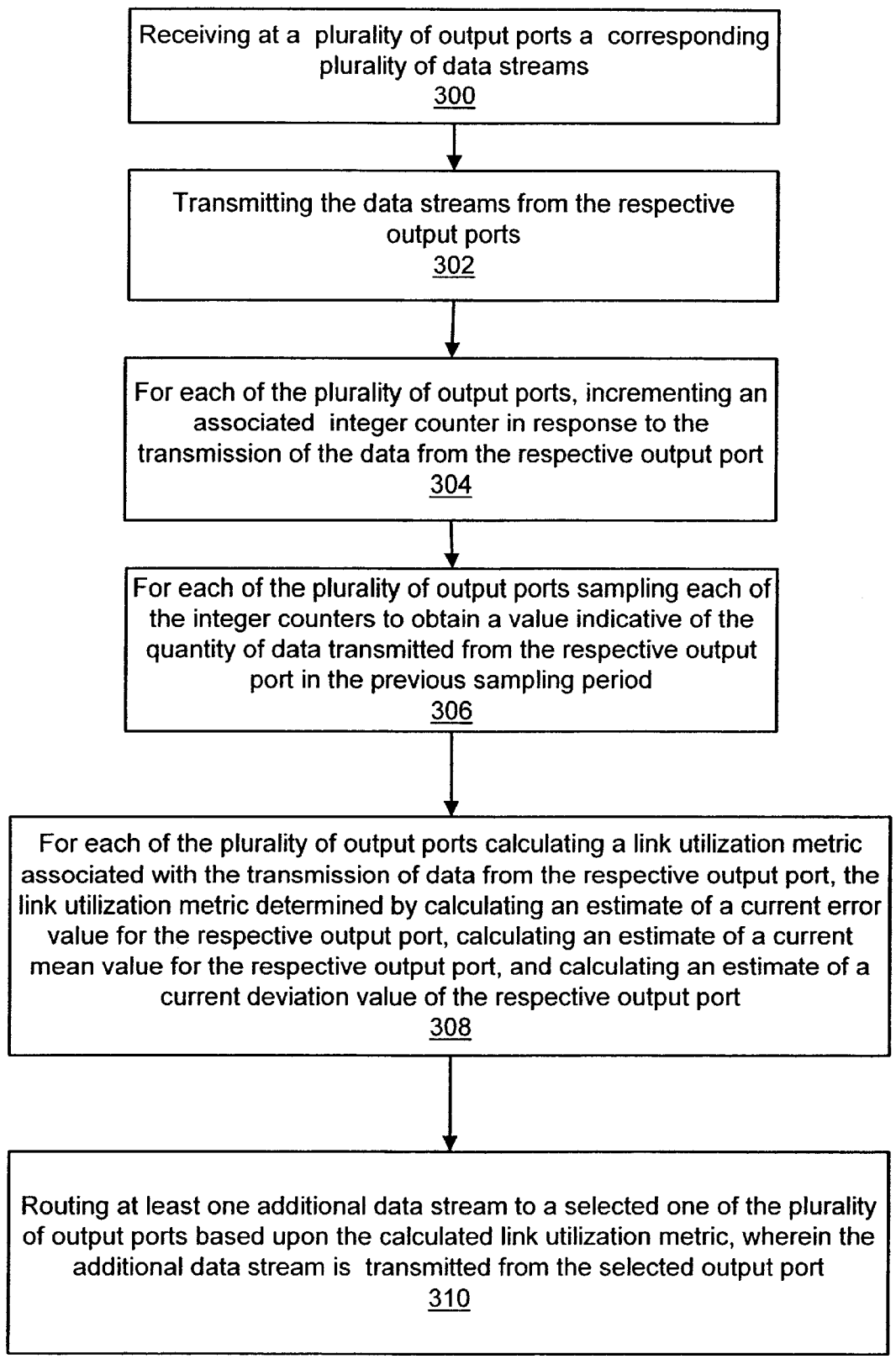
FIG. 3 is a flow chart depicting a method for estimating link utilization for routing additional data streams.

FIG. 3 depicts a flow chart illustrating a method for generating a plurality of metrics indicative of link utilization via integer operations for use in load balancing. In particular, a plurality of output ports receives a corresponding plurality of data streams, as depicted in step 300. Each data stream is transmitted from the corresponding output port, as depicted in step 302. For each of the plurality of output ports, an integer counter associated with the respective output port is incremented in response to the transmission of the data stream from the output port, as depicted in step 304. For each of the plurality of output ports, the respective integer counters is periodically sampled and a value indicative of the quantity of data transmitted through the respective output port is obtained, as depicted in step 306. For each of the plurality of output ports, the metric is calculated from a current error value, a current mean value, and a current deviation value as discussed above and as depicted in step 308. More specifically, the current error value is equal to the quantity of data transmitted through the respective output port in the last sampling period minus a historical mean value of the data transmitted through the respective output port over one or more sampling periods. The current mean value is equal to the historical mean value of the data transmitted through the respective output port over one or more sampling periods plus the product of a first predetermined multiplier times the current error value of the respective output port. The current deviation value is equal to a historical deviation value, which is the deviation value over one or more sampling periods, plus the product of a second predetermined multiplier multiplied by the difference of the absolute value of the current error value for the respective output port minus the historical deviation value for the respective output port. Based on the metrics for the respective ports, a determination may be made as to which output port the next incoming data stream is to be routed, as depicted in step 310.

Figure 4:
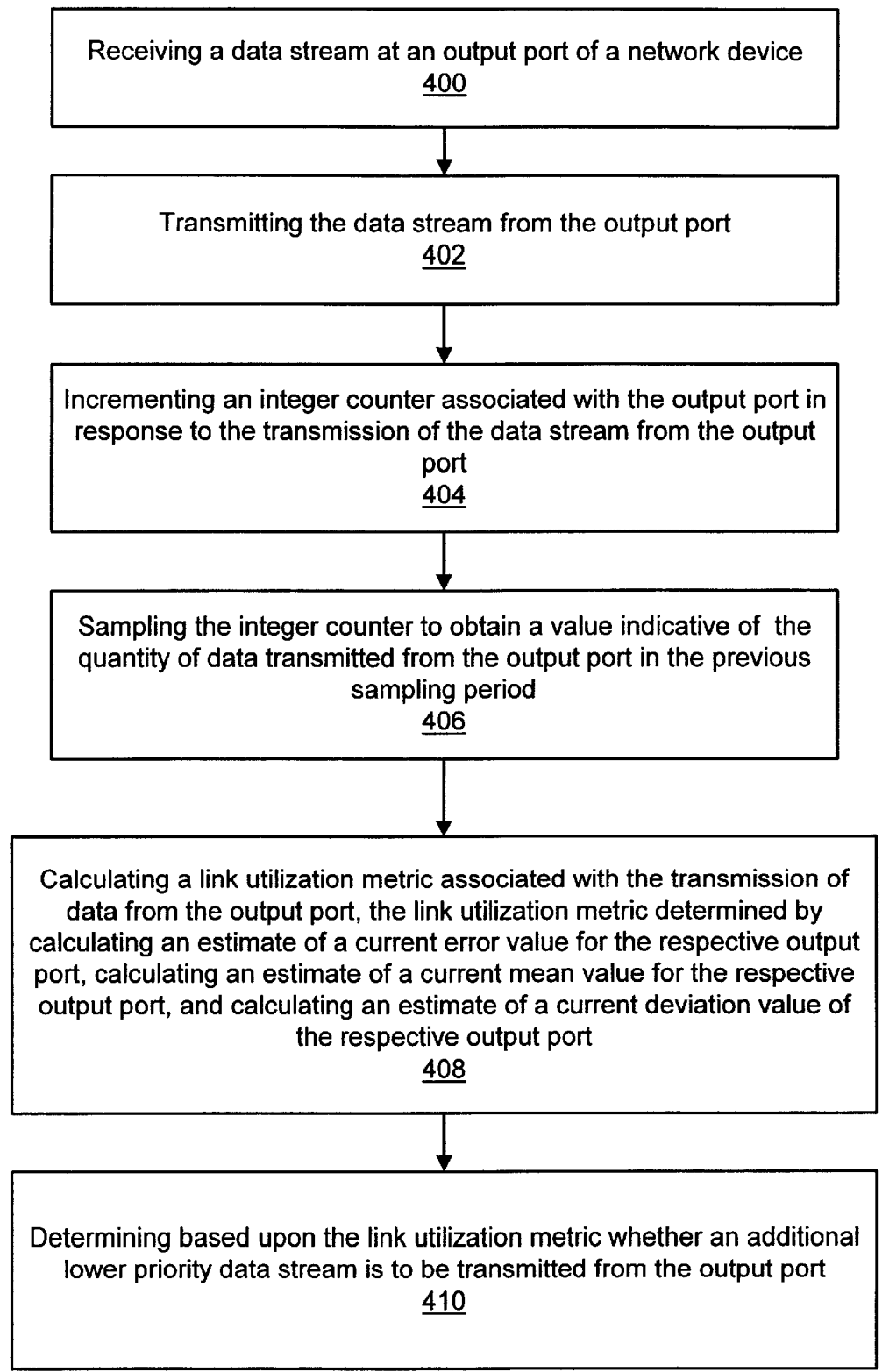
FIG. 4 is a flow chart depicting a method for determining whether to include low priority data traffic in an additional data stream.

FIG. 4 depicts a flow chart illustrating a method for generating at least one metric indicative of the link utilization via integer operations for assigning unused transmission bandwidth. In particular a data stream is received by an output port, as depicted in step 400. The data stream is transmitted from the output port, as depicted in step 402. An integer counter associated with the output port is incremented in response to the transmission of the data stream from the output port, as depicted in step 404. The integer counter is sampled and a value indicative of the quantity of data transmitted through the output port during the sampling period is obtained, as depicted in step 406. A metric is generated for the output port, based on a current error value, a current mean value, and a current deviation value, as depicted in step 408. The current error value is equal to the quantity of data transmitted through the output port in the last sampling period minus a historical mean value of the data transmitted through the port over one or more sampling periods. The current mean value is equal to the historical mean value of the data transmitted through the output port over one or more sampling periods plus the product of a first predetermined multiplier times the current error value. The current deviation value is equal to a historical deviation value, which is the deviation value of the output port over one or more sampling periods, plus the product of a second predetermined multiplier multiplied by the difference of the absolute value of the current error value minus the historical deviation value. The metric indicative of link utilization is generated as discussed above. Based on the link utilization metric, a determination is made as discussed above, whether lower priority data traffic is to be transmitted via the output port.

Those of ordinary skill in the art should further appreciate that variations to and modifications of the above described methods and apparatus for data stream management system and method can be made. Accordingly, the invention should not be viewed as limited except by the scope and spirit of the appended claims.

What is claimed is:

1. An apparatus for estimating link utilization within a network device having at least one output port comprising:
    an integer counter associated with said at least one output port, wherein said integer counter increments in response to a predetermined event associated with said transmission of data from said at least one output port via at least one associated output link; and
    sampling logic for periodically sampling said counter to ascertain a quantity of data transmitted from said at least one output port within said respective sampling period;
    calculation logic, said calculation logic operative to ascertain for each sampling period:
        an error value equal to said quantity of data minus a historical mean value corresponding to said mean value of data transmitted from said at least one output port during prior sampling periods;
        a current mean value equal to said historical mean value plus said product of a first predetermined multiplier times said error value; and
        a current deviation value equal to a historical deviation plus said product of a second predetermined multiplier multiplied by said difference of said absolute value of said error value minus said historical deviation value, wherein said error value, said current mean value, said historical mean value, and said current deviation value are all integer values.

2. The apparatus of claim 1 wherein said first predetermined multiplier is a negative power of two.

3. The apparatus of claim 2 wherein said first predetermined multiplier is one-fourth.

4. The apparatus of claim 1 wherein said second predetermined multiplier is a negative power of two.

5. The apparatus of claim 2 wherein said second predetermined multiplier is a negative power of two and is less than said first predetermined multiplier.

6. The apparatus of claim 5 wherein said second predetermined multiplier is one-eighth.

7. The apparatus of claim 1 wherein said at least one output port comprises a plurality of output links, each link having associated therewith an integer counter, sampling logic, and calculation logic, said apparatus further including routing logic coupled to at least one of said plurality of output ports, said routing logic receiving an input signal having a transmitted bandwidth therefrom, said routing logic further coupled to said calculation logic and receiving from said calculation logic said current mean value and said current deviation value, said routing logic operative to route said input signal to a selected output port as a function of said current mean value and current deviation value of said respective output ports.

8. The apparatus of claim 7 wherein said function is said current mean value that is greater than said transmitted bandwidth and is less than said mean values associated with said other output ports.

9. The apparatus of claim 7 wherein said function is said current mean plus said current deviation times a third predetermined multiplier, wherein said output port is selected in which said value of said function is greater than said transmitted bandwidth and less than said values of said function corresponding to said rest of said plurality of output ports.

10. The apparatus of claim 7 wherein said third multiplier is greater than one.

11. The apparatus of claim 10 wherein said third multiplier is selected from the group consisting of two, three, and four.

12. The apparatus of claim 1 wherein said at least one output port includes a plurality of output links, each output port having an available total bandwidth, said apparatus further including routing logic coupled to said least one output port, said routing logic receiving an input signal having a transmitted bandwidth, said routing logic further coupled to said calculation logic and receiving from said calculation logic said aggregate current mean value and said aggregate current deviation value associated with the corresponding at least one output port, said routing logic operative to route said input signal to a selected output port as a function of said current mean value and current deviation value of said respective output ports.

13. The apparatus of claim 12 wherein said function is the total bandwidth minus the quantity of said current aggregate mean plus said current aggregate deviation times a fourth predetermined multiplier, wherein said output port is selected in which said value of said function is greater than said values of said function corresponding to the other of said plurality of output ports.

14. The apparatus of claim 13 wherein said third multiplier is greater than one.

15. The apparatus of claim 14 wherein said third multiplier is selected from the group consisting of two, three, and four.

16. A method for estimating link utilization within a network device having a plurality of output ports, the method comprising the steps of:

receiving at a plurality of output ports a plurality of corresponding data streams;

transmitting said plurality of data streams from the respective output ports;

incrementing an integer counter associated with each of said plurality of output ports, wherein said integer counters increment in response to a predetermined event associated with said transmission of data from said at least two output ports;

sampling each of said integer counters to obtain a value indicative of the amount of data transmitted from said respective output ports within said respective sampling period;

calculating for each of said plurality of output ports a link utilization metric based on at least three link parameters, said link parameters include a current error value, said current error value equal to said value sampled from said respective integer counter minus a historical mean value corresponding to said mean value of data transmitted from said respective output port during prior sampling periods, a current mean value equal to said historical mean value of said respective port plus said product of a first predetermined multiplier times said current error value of said respective port, and said current deviation value equal to a historical deviation value of the respective output port, said historical deviation value being equal to said deviation value of the respective output port during prior sampling periods, plus the product of a second predetermined multiplier multiplied by the difference of the absolute value of said current error value minus said historical deviation value, wherein said current error value, said current mean value, said historical mean value, said historical deviation value and said current deviation value are all integer values; and forwarding at least one additional data stream to a selected one of said plurality of output ports for transmission from said respective output port based upon said link utilization metric.

17. The method of claim 16 wherein said first predetermined multiplier is a negative power of two.

18. The method of claim 16 wherein said first predetermined multiplier is one-fourth.

19. The method of claim 16 wherein said second predetermined multiplier is a negative power of two.

20. The method of claim 16 wherein said second predetermined multiplier is a negative power of two and is less than the first predetermined multiplier.

21. The method of claim 20 wherein said second predetermined multiplier is one-eighth.

22. A method for estimating link utilization within a network device having an output port comprising the steps of:

receiving a data stream at an output port;

transmitting said data stream from said output port;

incrementing an integer counter associated with said output port, wherein said integer counter increments in response to a predetermined event associated with said transmission of data from said output ports;

sampling said integer counter to obtain a value indicative of the amount of data transmitted from said output port within said respective sampling period;

calculating for said output port a link utilization metric based on three link parameters including, a current error value equal to said value sampled from said integer counter minus a historical mean value corresponding to said mean value of the data transmitted from said output port during prior sampling periods, a current mean value, said current mean value equal to said historical mean value of said port plus said product of a first predetermined multiplier times said current error value, and a current deviation value, said current deviation value being equal to a historical deviation value of said output port, said historical deviation value being equal to said deviation value of said output port during prior sampling periods, plus the product of a second predetermined multiplier multiplied by the difference of the absolute value of said current error value minus said historical deviation value, wherein said current error value, said current mean value, said historical mean value, said historical deviation value and said current deviation value are all integer values; and determining based on said calculated link utilization metric whether an additional lower priority data stream is to be transmitted from said output port.

23. The method of claim 22 wherein said first predetermined multiplier is a negative power of two.

24. The method of claim 22 wherein said first predetermined multiplier is one-fourth.

25. The method of claim 22 wherein said second predetermined multiplier is a negative power of two.

26. The method of claim 22 wherein said second predetermined multiplier is a negative power of two and is less than said first predetermined multiplier.

27. The method of claim 26 wherein said second predetermined multiplier is one-eighth.

* * * * *